United States Patent
Parker et al.

(10) Patent No.: US 6,677,976 B2
(45) Date of Patent: Jan. 13, 2004

(54) INTEGRATION OF VIDEO TELEPHONY WITH CHAT AND INSTANT MESSAGING ENVIRONMENTS

(75) Inventors: Benjamin J. Parker, Overland Park, KS (US); Shane R. Werner, Olathe, KS (US); Charles Diaz, Olathe, KS (US); Terry M. Frederick, Lenexa, KS (US)

(73) Assignee: Sprint Communications Company, LP, Overland Park, KS (US)

( * ) Notice: Subject to any disclaimer, the term of this patent is extended or adjusted under 35 U.S.C. 154(b) by 40 days.

(21) Appl. No.: 10/085,878

(22) Filed: Feb. 28, 2002

(65) Prior Publication Data

US 2003/0074451 A1 Apr. 17, 2003

Related U.S. Application Data

(63) Continuation-in-part of application No. 10/033,813, filed on Jan. 3, 2002, which is a continuation-in-part of application No. 09/978,616, filed on Oct. 16, 2001.

(51) Int. Cl.[7] .................................................. H04N 7/14
(52) U.S. Cl. ................ 348/14.08; 709/204; 379/202.01; 348/14.03
(58) Field of Search ........................... 348/14.01–14.08, 348/14.09, 14.1, 14.11–14.13; 370/260, 261, 352; 709/204, 225, 229, 239, 227; 345/753, 758; 379/202.01

(56) References Cited

U.S. PATENT DOCUMENTS

| | | | |
|---|---|---|---|
| 5,689,553 A | 11/1997 | Ahuja et al. | |
| 5,764,916 A | 6/1998 | Busey et al. | |
| 5,949,763 A | 9/1999 | Lund | |
| 6,097,793 A | 8/2000 | Jandel | |
| 6,175,619 B1 * | 1/2001 | DeSimone | 379/202.01 |
| 6,301,609 B1 | 10/2001 | Aravamudan et al. | |
| 6,337,858 B1 | 1/2002 | Petty et al. | |
| 6,370,137 B1 | 4/2002 | Lund | |
| 6,564,261 B1 * | 5/2003 | Gudjonsson et al. | 709/227 |

FOREIGN PATENT DOCUMENTS

| | | | |
|---|---|---|---|
| EP | 0 721266 | 7/1996 | |
| EP | 1 059 798 | 12/2000 | |
| EP | 1176840 A1 * | 1/2002 | H04Q/7/22 |
| GB | 2357659 | 6/2001 | |
| WO | 0 999712 | 5/2000 | |
| WO | WO 01/71994 | 9/2001 | |

* cited by examiner

Primary Examiner—Melur Ramakrishnaiah

(57) ABSTRACT

The present invention establishes a direct communication session between separate users that are engaged in active sessions in an Internet chat or instant messaging environment. Within these active sessions, a video telephony call is initiated for sending video over a public data network simultaneously with sending voice within a telephone call placed over a public telephone network.

11 Claims, 7 Drawing Sheets

INTEGRATION OF VIDEO TELEPHONY WITH CHAT AND INSTANT MESSAGING ENVIRONMENTS

CROSS REFERENCE TO RELATED APPLICATIONS

The present application is a continuation-in-part of pending U.S. application Ser. No. 10/033,813, filed Jan. 3, 2002, entitled "Telephonic Addressing For Establishing Simultaneous Voice and Computer Network Connections", which is a continuation-in-part of prior U.S. application Ser. No. 09/978,616, filed Oct. 16, 2001, entitled "Video Telephony".

STATEMENT REGARDING FEDERALLY SPONSORED RESEARCH

Not Applicable.

BACKGROUND OF THE INVENTION

The present invention relates to establishing a communication session between users that are engaged in active sessions in an Internet chat or instant messaging environment, and more specifically, to initiating a video telephony call sending video over a public data network simultaneously with sending voice within a telephone call placed over a public telephone network.

Internetworking (i.e., the interconnection of many computer networks) allows the interaction of very large numbers of computers and computer users. The most well known example is the Internet. Computers connected to the Internet may be widely separated geographically and utilize many different hardware and software configurations. In order to achieve communication sessions between any two endpoints on the Internet, an addressing system and various standard protocols for exchanging computer data packets have been developed.

Each packet sent over the Internet includes fields that specify the source and destination address of the packet according to Internet Protocol (IP) addresses assigned to the network interface nodes involved. Currently assigned addresses comprise 32 bits, although future standards allow for 128 bit addresses. The 32 bit addresses are normally written by breaking the 32 bits into 4 groups of 8 bits each and writing the decimal equivalents of each group separated by periods (e.g., 208.25.106.10).

Since numerical IP addresses are inconvenient to use and remember, a protocol for assigning and accessing logical names is used known as the domain name system (DNS). DNS servers are deployed within the Internet which perform a translation function between a logical domain name such as "sprint.com" and its numerical equivalent "208.25.106.10". After receiving an IP address back from a DNS server, a computer can forward data packets to the IP address and establish a connection or session with the remote computer.

While the DNS system works well for hosted content (e.g., material made available for browsing by commercial and private entities), it is not well suited to ad hoc communications or exchanges of data between individuals. Hosting a website and registering an IP address within the DNS system is expensive and time consuming. Furthermore, due to an impending shortage of IP addresses and the cost for maintaining use of each IP address, many Internet service providers assign IP addresses dynamically to their individual users. In other words, when a user signs on to their service, they are temporarily assigned an IP address from an address pool assigned to their service provider. The user occupies that IP address only for their current session.

Even when individual users have their own static IP addresses, and when other users can remember the IP address of a user with whom they would like to establish a connection session over the Internet (e.g., for voice or video telephony), the need to configure their hardware or software is too complex for many users. This is one reason why e-mail is such a popular and successful Internet application. A mail server with an easy to remember domain name acts as intermediary between two individual users. Using a simple application program and the recipient's account name on the mail server (i.e., their e-mail address), text messages and computer files can be exchanged. The exchange, however, does not allow the users to interact in real time.

Two Internet applications that have been implemented to provide real-time interaction between users are chat and instant messaging. In chat applications, a group of users access a chat server which relays communications from each individual user to each of the users in the group (i.e., a chat room). Thus, when one user types text within the chat application on their computer, the text is transmitted to the chat server which then relays or forwards that text to all the users active in the particular chat session for displaying within the chat application on the active users' computers. Chat servers which utilize video data have also been realized. In a typical chat environment, chat rooms may be available to any users requesting access to them based on predefined subject areas of the chat rooms. Thus, a user can interact in the chat room with other users that they do not know in advance.

Instant messaging (IM) is similar to chat applications except that each user sets up a personalized contact list in advance of other users with whom they may wish to exchange instant messages. When an IM user goes online, their IM application sends a message to the IM server. The IM server identifies which other users in the user's contact list are also on line and then sends status messages to the user and the contacts, enabling any of them to initiate a private exchange of messages.

The present invention is related to video telephony as taught in copending U.S. application Ser. No. 09/978,616 and Ser. No. 10/033,813. In the described video telephony system, the Internet or other computer network provides a channel for carrying a video portion of a video telephony call while the POTS (plain old telephone system) or PSTN (public switched telephone network) provides a channel for carrying the voice portion of the video telephony call.

An important issue in Internet communications is the bandwidth or speed at which any particular connection operates. In the case of prior art video conferencing using the Internet (such as video chat), insufficiency of the bandwidth utilized for a video call has caused poor voice and picture quality. In the above video telephony system, the voice channel provides more than enough bandwidth to ensure that a good quality voice transmission is obtained. In addition, removing the voice data from the Internet transmission frees up more of the available bandwidth for the video data in that channel. Moreover, since the actual understanding of the video telephony conversations by the participants depends more on the voice signals than on the video signals, the overall satisfaction with video telephony is increased even when video quality may be somewhat lacking.

SUMMARY OF THE INVENTION

The present invention relates to enhancing communication between individual users of a computer network, such as the Internet, by providing a transition from a chat or instant messaging environment to a video telephony call.

In one primary aspect of the invention, a method is provided for initiating a video telephony call between at least first and second users, wherein the users have first and second computers and first and second telephones, respectively. The first and second computers are coupled to a computer network and have first and second IP addresses, respectively, and the first and second telephones have first and second telephone numbers, respectively. In the inventive method, first and second computers send log-in messages to a central server coupled to the computer network, wherein the central server stores the first and second IP addresses in association with the first and second telephone numbers, respectively. The central server sends active user identifying information to the first and second computers for a plurality of users currently logged-in to the central server. The first and second computers each display a plurality of available users in response to the active user identifying information, wherein the first computer displays a user selection item corresponding to the second user. The first user activates the user selection item. The first computer sending a video telephony call request identifying the second user to the central server in response to the activation of the selection item. The central server forwards the video telephony call request to the second computer. The second computer displays an acceptance selection item. The second user selects the acceptance selection item. Then the second computer sends an acceptance message to the central server in response to the selection of the acceptance selection item. The first and second computers launch respective video telephony call clients. The call clients exchanging live video data in response to the first and second IP addresses stored in the central server for a video portion of the video telephony call. The central server also establishes a telephone call between the first and second telephones for a voice portion of the video telephony call using a public switched telephone network in response to the first and second telephone numbers stored in the central server.

DETAILED DESCRIPTION OF PREFERRED EMBODIMENTS

Figure 1:
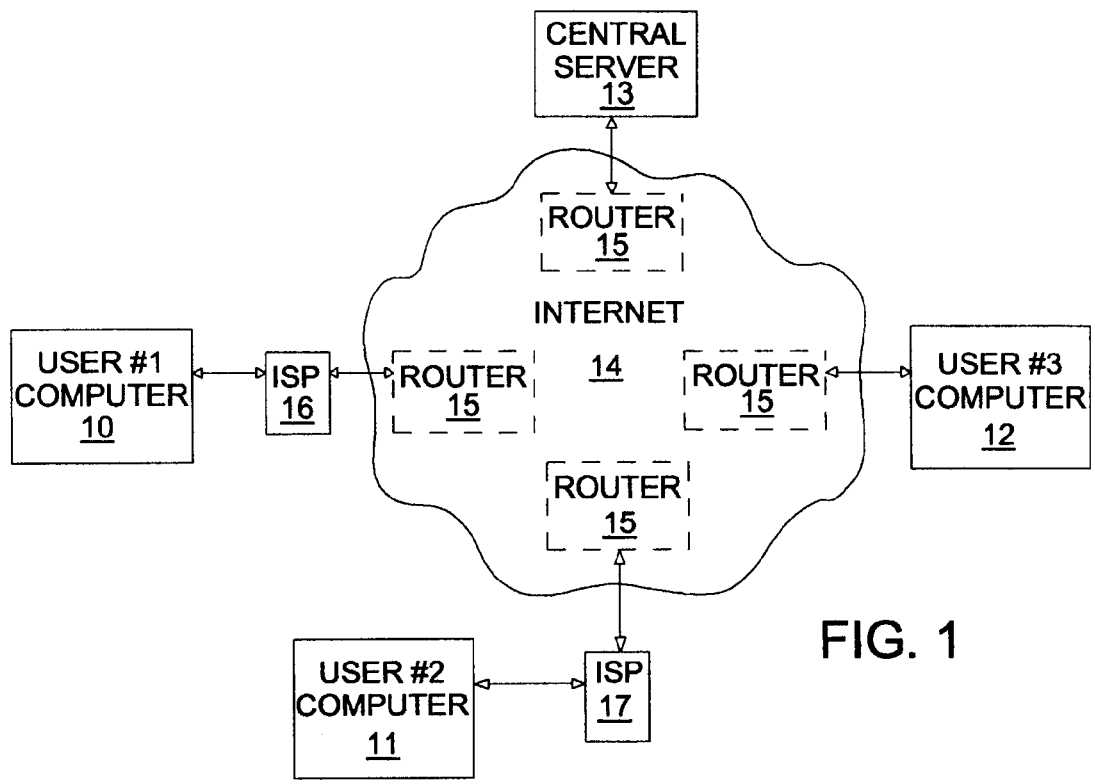
FIG. 1 is a block diagram showing the interconnection of users over the Internet to the central server of the present invention.

Referring to FIG. 1, a plurality of user computers 10, 11, and 12, and a central server 13 are internetworked via the Internet 14. A plurality of routers 15 within Internet 14 direct packets between various endpoints or nodes. Computers 10 and 11 are shown as being connected to Internet routers belonging to Internet Service Providers (ISP's) 16 and 17, respectively. The connections to the ISP's may be by dial-up, digital subscriber line (DSL), cable modem, or integrated access device (IAD), for example. Central server 13 and computer 12 are shown directly connected to a router.

Network communication comprises data messages or packets transferred between separate endpoints, such as between computers 10, 11, or 12 (as clients) and central server 13. The packet transfer is accomplished by routers 15 using the IP addresses contained in each packet. Central server 13 typically has a fixed IP address that is listed on the DNS servers accessible to each computer. Each computer user can easily communicate with central server 13 by supplying its logical name (e.g., www.sprint.exchange.com) which is automatically resolved by their browser into an IP address by consulting a DNS server. Exchanging packets between users 10, 11, and 12 themselves cannot usually be accomplished in the same way because the users and their IP addresses are not listed in the DNS system.

Figure 2:
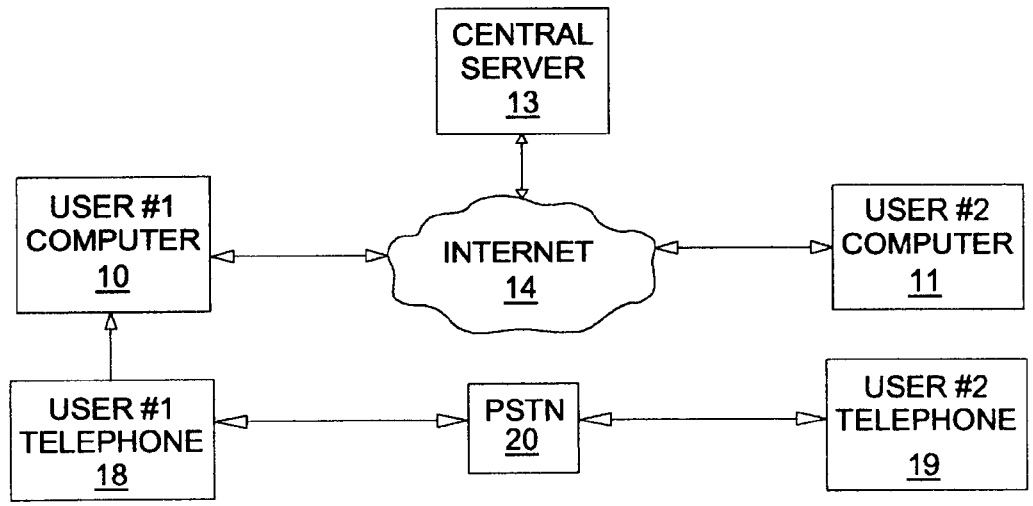
FIG. 2 is a block diagram showing a video telephony connection model as used in the present invention.

The present invention facilitates exchanging data messages between two individual users by providing a specialized directory or look-up within central sever 13. As shown in FIG. 2, the present invention simultaneously establishes a voice telephone call between the two individual computer users. Computers 10 and 11 have associated telephones 18 and 19 used by the same respective users. The computers and telephones may be fixed installations (e.g., in a residence or a business office) or may be mobile devices (e.g., laptop computer and cellular phone), as long as both are accessible to each user at the same time. The telephones are connected to the public switched telephone network (PSTN) 20. Central server 13 provides a user look-up and interconnecting service for registered users. For security and/or billing purposes, access to the service preferably is tied to user ID's and passwords. A user may be given an ID and password with initial sign-up for the video telephony service. Each user would manually configure the telephone number that they want to be associated with. When the user is "on-line" (i.e., has their computer turned on and connected to Internet 14), their computer sends a registration message to central server 13 to notify it that the user is available. Central server 13 can inspect the registration message to determine the current IP address and port number at which the user resides for its current connection session. Alternatively, the user may manually configure their IP address in some circumstances. In any case, central server 13 contains a database of currently active, registered users. Each user entry in the database includes fields for user ID, password, telephone number, and IP address (including port number), and user status, for example.

In the video telephony system as described in the prior, co-pending applications, a user #1 dials telephone 18 to make a voice call to a user #2 at telephone 19. The telephone number dialed by user #1 is captured as a target telephone identifier number and sent to computer 10 being used by user #1. Computer 10 forwards the target telephone number to central server 13 as part of an access request for establishing a connection with user #2. Central server 13 looks up the target number in its database. When it finds the target number, central server 13 identifies the IP address associated with user #2 and sends an initiation message to computer 11 being used by user #2. The initiation message identifies user #1 (preferably by both telephone number and user ID) and the type of data to be exchanged (i.e., the application program to receive the data). Using computer 11, user #2 can verify the calling party as user #1 and can indicate whether they accept the computer network connection with user #1. Once user #2 accepts, data messages can be exchanged between application programs running on computers 10 and 11. The application programs can be written to perform file transfers of various types of files, video data or frames for video telephony, or other real-time data or control signals. Data exchange can continue until either user deactivates their application program.

Figure 3:
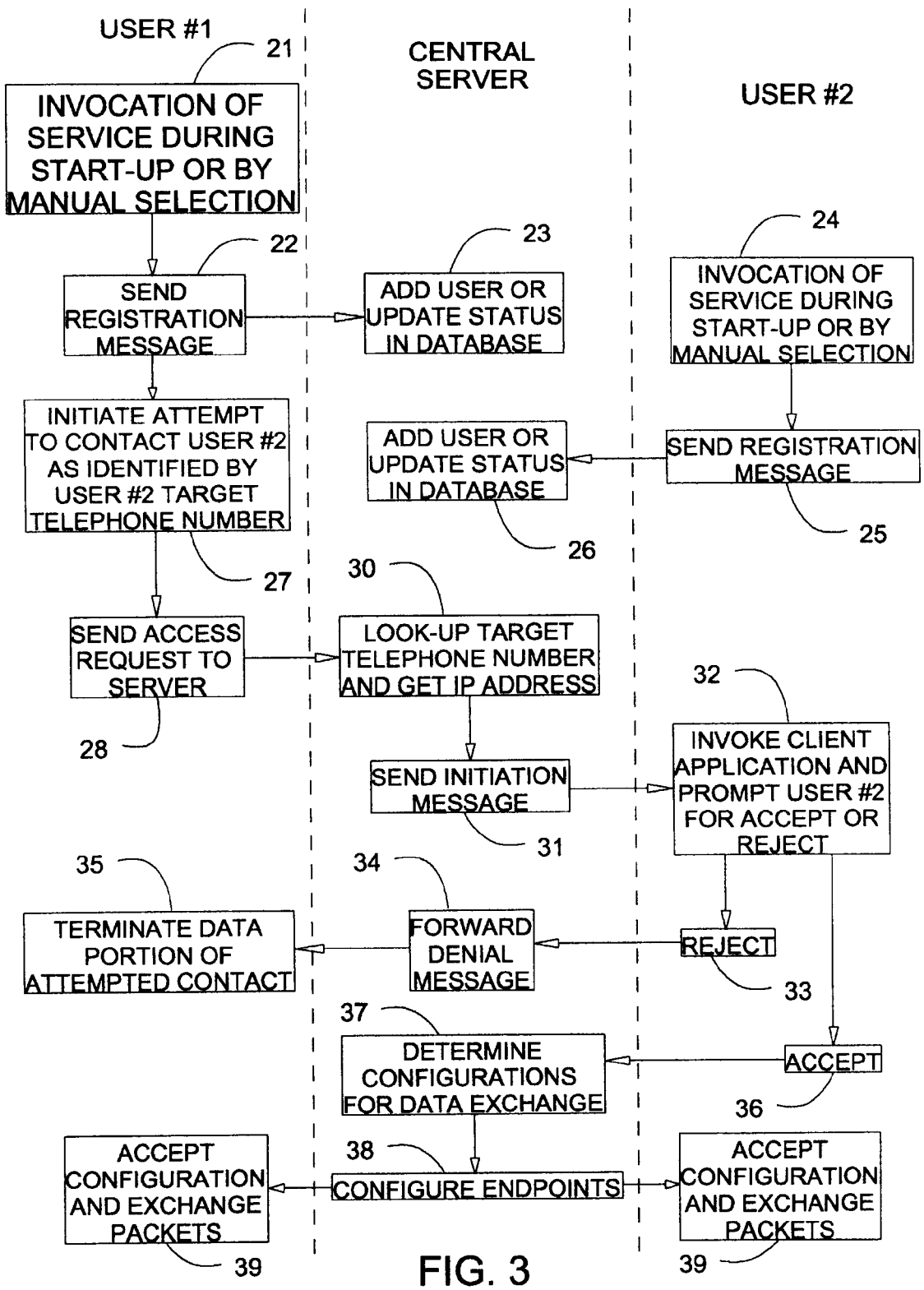
FIG. 3 is a flow diagram of a method for initiating a video telephony call in a specific video telephony environment.

The sequence of events occurring during manual user initiation of a video telephony call is shown in greater detail in FIG. 3, in which user #1 events are in the left column, central server events in the center column, and user #2 events in the right column. In step 21, user #1 manually invokes the real-time video telephony service. This can be configured as part of the normal start-up of their computer or can result from manually launching a software application or client program after start-up has finished. When the service is invoked by user #1, a registration message is sent to the central server in step 22. The registration message preferably includes the user ID and password assigned to user #1. The registration message would typically also include the telephone number being used by user #1 and an IP address. Although the IP address may be explicitly added to the message by user #1, the IP address (and port number) is typically embedded in each packet forwarded by the network and the central server preferably extracts the automatically embedded IP address and port number so that the user does not need to know it. Alternatively, the telephone number and/or IP address may have been configured on the central server during a previous connection session of user #1, in which case the registration message only needs to contain the user ID and password so that the central server knows that user #1 is active and ready to receive data calls. In step 23, the central server receives the registration message and adds the new user to the database or updates the user status, as necessary.

Separately, user #2 invokes the real-time video telephony service in step 24. User #2 sends a registration message in step 25, and the central server receives the registration message and adds user #2 to the database or updates the user status, as necessary. Thereafter, the central server may periodically exchange further messages with each registered user to keep the user status current and to maintain an open session with each user, for example. When a user shuts down their application program or their computer, an unregister message (not shown) may also be sent to the central server.

During the time that user #1 is on-line, it is desired to exchange computer data with user #2. In step 27, user #1 initiates an attempt to contact user #2 and set up the data exchange. According to the manual initiation method of the prior applications, user #1 identifies user #2 by virtue of user #2's telephone number. This target telephone number was preferably captured from the act of dialing it on user #1's telephone equipment. A dedicated module could be connected to user #1's telephone to detect the DTMF tones while dialing and to send the dialed number to user #1's computer. The target telephone number for user #2 is included in an access request message sent to the central server in step 28.

In step 30, the central server looks up the target telephone number and gets the IP address (and port number) associated with user #2. The initiation message is sent by the central server in step 31.

User #2 receives the initiation message in step 32. If not already running, the user #2 computer launches the appropriate client application for responding to the initiation message and then prompts user #2 to either accept or reject the access request. If rejected, then user #2 generates a reject message in step 33 and sends it to the central server. In step 34, the central server forwards the reject message to user #1, which then terminates the data portion of the attempted communication session in step 35 (the voice telephone call is accepted, rejected, or terminated separately).

If user #2 accepts the attempted contact and the request for data exchange, then user #2 causes their computer to generate an accept message in step 36 (e.g., by clicking an "accept" button in an application interface) and sends it to the central server. In step 37, the central server determines any needed configurations for accomplishing the data exchange and then configures the user #1 and user #2 endpoints in step 38. The two main configurations for the data exchange will be described in connection with FIGS. 4 and 5. The user #1 and user #2 computers accept the configuration and then begin to exchange the data messages or packets in step 39. Other configuration issues, such as the configuration of the client application programs exchanging the actual data messages can be handled within the access request message, then initiation message, the accept message, and/or other packets exchanged between the endpoints, for example.

Figure 4:
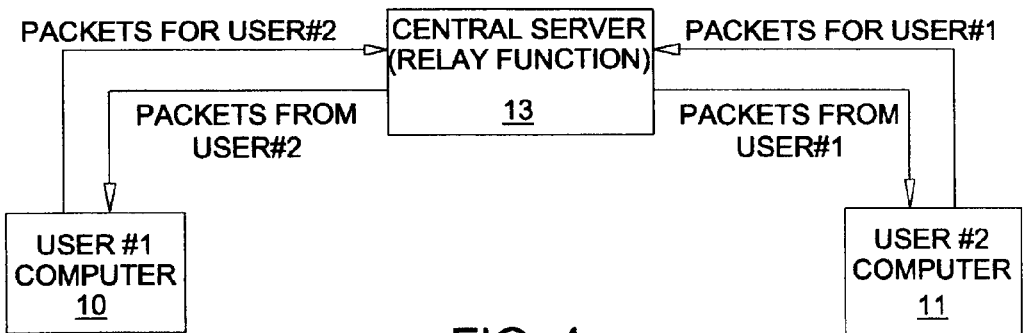
FIG. 4 is a block diagram showing a first embodiment of packet flow in a video telephony call.

A first packet exchange configuration is shown in FIG. 4 wherein central server 13 performs a relay function such that all packets exchanged between computer 10 and computer 11 pass through central server 13. In other words, after a desired user (called party) accepts the data call and central server notifies the first user (calling party) of the acceptance, both endpoints continue to address their sent packets to central server 13. At central server 13, each packet is redirected by substitution of IP addresses. For example, a packet sent from computer 10 including its own IP address as the source address of the packet and the IP address of central server 13 as the destination address of the packet is modified after being received by central server 13 to have the central server's address as its source address and to have the IP address of computer 11 as its destination address. After modification, central server 13 sends the packet back to its router and on to computer 11. The same operations are used to send packets from computer 11 to computer 10. The embodiment of FIG. 4 has the advantage that greater privacy of a user's IP address is maintained since each user's computer only needs to see the IP address of central server 13. Furthermore, this configuration can readily function in the presence of network address translation (NAT) firewalls at the endpoints.

Figure 5:
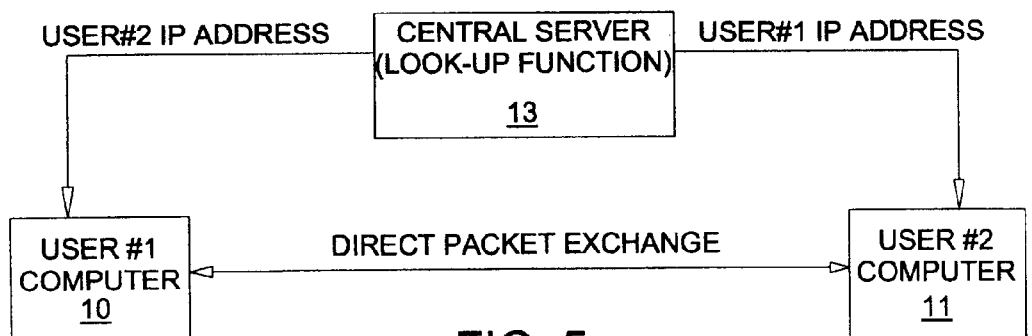
FIG. 5 is a block diagram showing a second embodiment of packet flow in a video telephony call.

FIG. 5 shows an alternative configuration in which direct packet exchange between computers 10 and 11 is realized. Central server 13 provides a look-up function and a connection initiation function. If desired user #2 (called party) accepts a data call, then central server 13 provides the IP address of computer 11 to computer 10 and provides the IP address of computer 10 to computer 11. Thereafter, each computer can send packets addressed to the other computer and the packets are no longer relayed through central server 13. This embodiment has the advantage that central server 13 may be reduced in size since less traffic flows through it.

Figure 6:
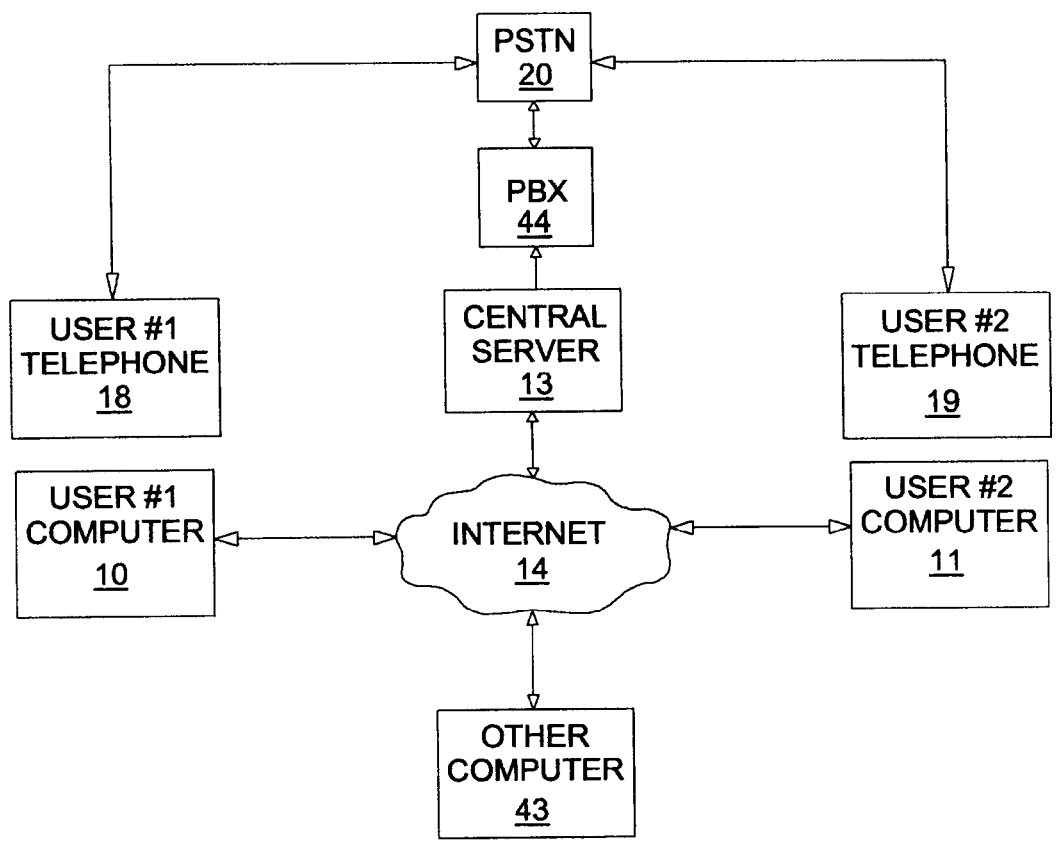
FIG. 6 is a block diagram showing an alternative embodiment for initiating a telephone call portion of the user connection from within the computer network.

In a further example of initiating a video telephony call, the data call can be initiated from within the computer network rather than by the dialing of the telephone voice call. For instance, the first user may simply enter the desired user's target telephone number manually into the application program for exchanging the data messages. Alternatively, a network-based directory can be set up by a user and stored on central server 13 to facilitate making a data call. Furthermore, the data call initiation need not be done by the actual recipients of the data call. As shown in FIG. 6, another computer 43 connected to Internet 14 may generate an access request that identifies both user #1 and user #2 as called parties. Central server 13 could also initiate a data call itself, as described below in connection with video telephony service being integrated in a chat and/or instant messaging environment.

In a network initiated video telephony call, the telephone voice call is established in response to the initiation of the data call instead of the other way around. A private branch exchange (PBX) 44 is coupled to central server 13. As a data connection is being established, central server 13 triggers PBX 44 to initiate a telephone voice call over PSTN 20 to the target telephone numbers associated with each endpoint of the data call, for example.

Figure 7:
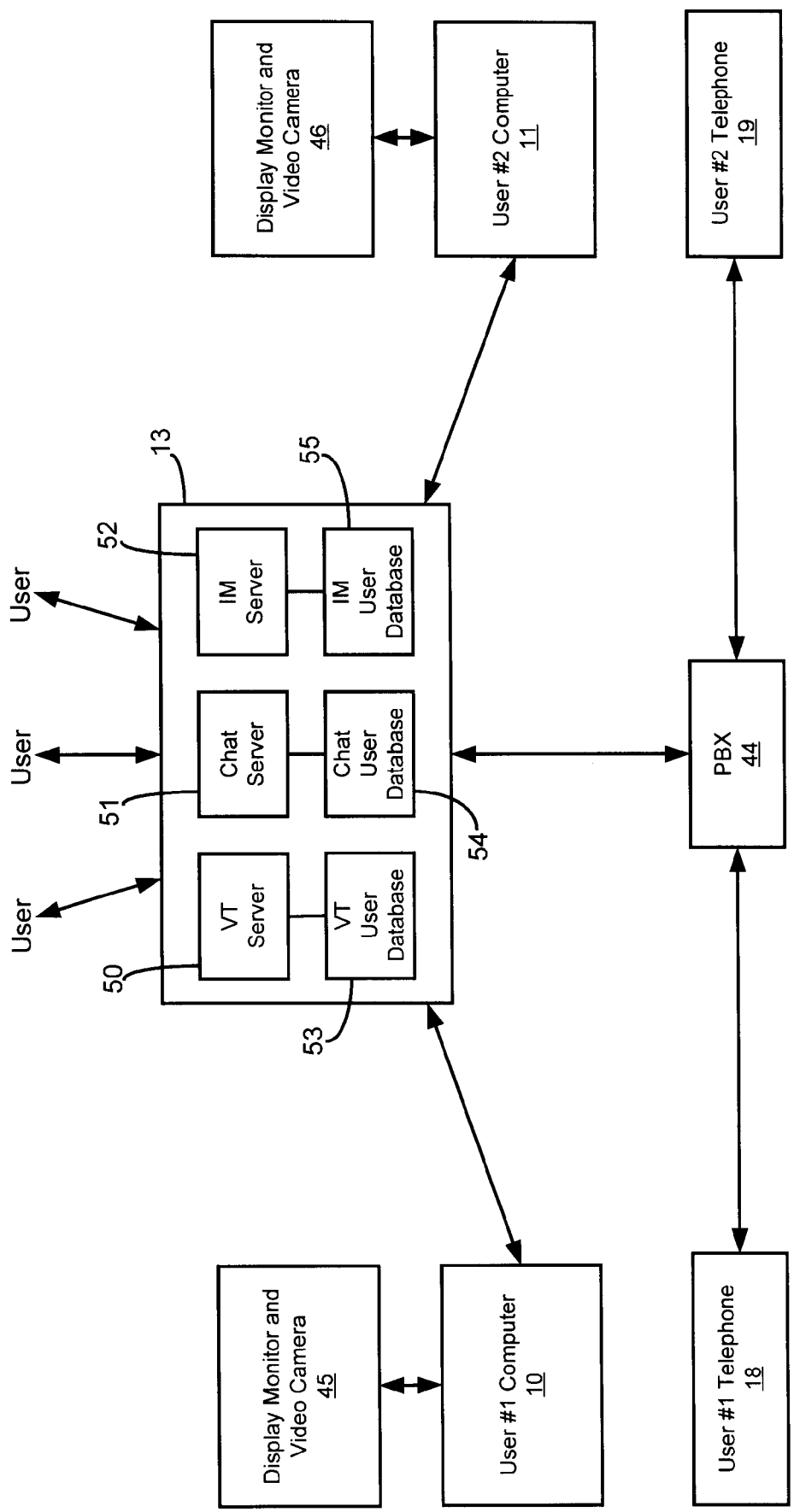
FIG. 7 is a block diagram showing integration of a video telephony system with a central server also providing chat and/or instant messaging services.

FIG. 7 shows integration of video telephony with chat and instant messaging applications, wherein central server 13 runs a video telephony (VT) server application 50, a chat server application 51, and an instant messaging (IM) server application 52. Server applications 50–52 are programmed to interact in the manner described below, and a supervisory application may be provided. Server 13 also includes a VT user database 53, a chat user database 54, and an IM user database 55. Other equivalent structures will be apparent to those skilled in the art, such as a single shared database. Furthermore, server 13 could comprise several host computers acting in coordination.

Databases 53–55 include appropriate details for supporting each respective communication service, such as user ID's and passwords, billing information, IP addresses, telephone numbers, user preferences, and on-line status.

Computers 10 and 11 communicate with central server 13 via a public data network, such as the Internet. Telephones 18 and 19 are connected to a public switched telephone network, as is PBX 44 which is controlled by central server 13. Computer 10 includes a user interface with a display monitor and video camera 45 and computer 11 has a similar user interface 46.

Figure 8:
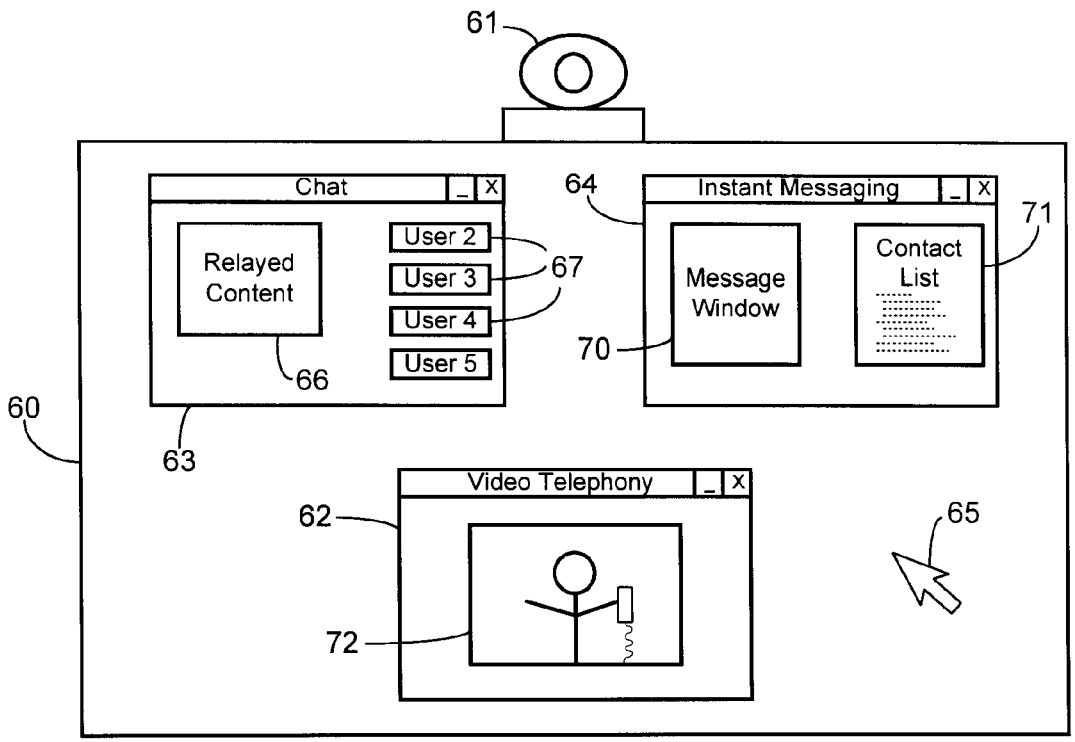
FIG. 8 illustrates the user environment of the integrated services of the present invention.

The user interface for communicating with each server application is shown in greater detail in FIG. 8. A display monitor 60 is preferably located in close proximity with a video camera 61. Each client application running on the user's computer runs in a respective program window, including a VT call window 62, a chat window 63, and an IM window 65. The user interface preferably also includes a pointing device such as a computer mouse for manipulating a mouse pointer 65 to activate various selection items within the program windows.

Chat program window 63 is controlled by a chat client running within the user's computer and communicating with the chat server application running in the central server. Relayed content within a current chat room is shown within a relayed content area 66. A plurality of thumbnail graphics 67 (e.g., pictorial or text representations) for each of the other users active within the current chat room are displayed in chat program window 63. The representations may be provided by the chat server application as part of the active user identifying information that it sends concerning each chat room participant to all the other participants.

According to the present invention, a thumbnail 67 of another user may be selected in order to initiate a separate (e.g., private) communication with the corresponding user. The separate communication may be by a video telephony call or within another application, such as another (restricted) chat room.

IM program window 64 is controlled by an IM client running within the user's computer and communicating with the IM server application running in the central server. A message window 70 shows the messages exchanged between the user and their contacts. A contact list window 71 shows a listing of all the other preselected users on the user's contact or buddy list. The list shows the on-line status of each contact, allowing the user to identify which contacts are currently available.

According to the present invention, each listed contact that is on-line may be selected in order to initiate a video telephony call with the contact. Thus, mouse pointer 65 can be moved over the user selection item (e.g., the contact's name) and by mouse clicking, the selection item is activated and a sequence of events is initiated to complete a VT call with the contact.

When a VT call is established, the remote user may be seen within a video window 72 in VT program window 62.

Figure 9:
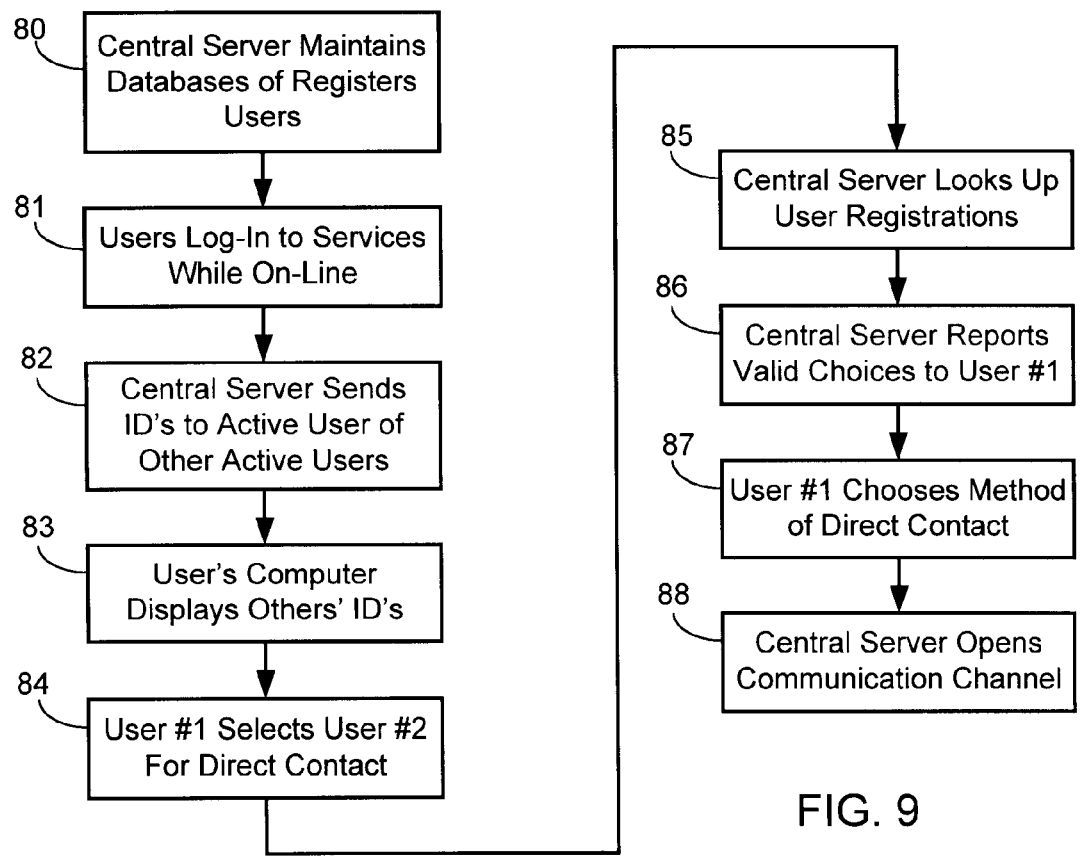
FIG. 9 is a flowchart showing one preferred method of accessing the integrated services of the present invention.

One preferred method of the present invention is shown in FIG. 9. At step 80, the central server maintains the databases of registered users for each of the communication services (e.g., VT, chat, and IM). When respective users are on-line, their computers log-in to the services for which they are eligible in step 81. In step 82, the central server sends to an active user the identifying information (e.g., user ID, name, and/or picture) of all other active users or a subgroup of users within the service. In step 83, each user's computer displays the identifying information of the other active users within the program window for the corresponding communication service.

In step 84, user #1 selects user #2 for making a direct contact as a supplemental communication to the chat room or to the instant messaging window. In one embodiment, the supplemental communication may always be comprised of a VT call which may be initiated immediately after step 84 using the steps shown in FIG. 10. Alternatively, the supplemental communication may be initiated from any of several communication channels including the VT application, the chat application, or the IM application. Thus, the central server may look-up the user registrations for the called user and/or the calling user in step 85. The valid services within which a direct communication channel can be opened is reported back from the central server to user #1 in step 86. The user chooses the method of direct contact in step 87 and the central server opens the communication channel in step 88.

Figure 10:
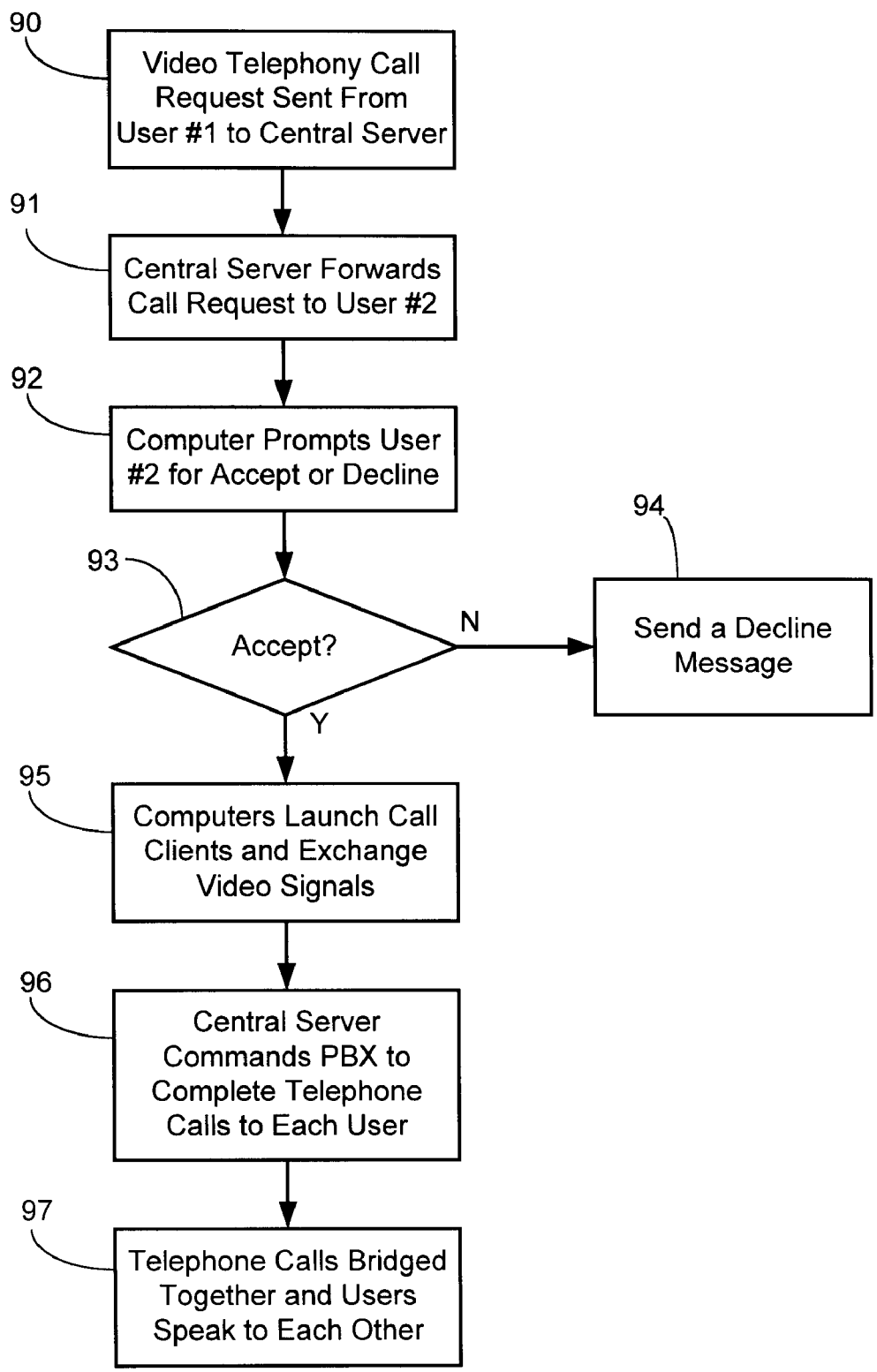
FIG. 10 is a flowchart showing a sequence of events after a user selects a video telephony connection using the present invention.

FIG. 10 shows a preferred method for establishing a video telephony call. In step 90, a video telephony call request signal is sent from user #1 to the central server (e.g., in response to user #1's choice between a VT call or a private chat room in step 87). In step 91, the central server forwards the call request to user #2. The user interface on user #2's computer generates a VT call prompt wherein user #2 can accept or decline the VT call. The prompt may take the form of a pop-up message with an accept button and a decline button that are chosen by clicking of the computer mouse. A check is made in step 93 to determine whether user #2 accepts the VT call. If not, then a decline message is sent in step 94.

Otherwise, both computers launch a respective VT call client application (if not already running) and begin to exchange live video signals from their respective video cameras in step 95. In order to initiate the voice portion of the VT call, the central server commands the private branch exchange (PBX) to complete telephone calls to each user in step 96. In step 97, the telephone calls are bridged together and the users can speak to one another.

Alternatively, a telephone call can be established directly between user #1 and user #2 in response to a message from the central server to the call client of user #1, wherein the message includes the telephone number of user #2 (which may be encrypted). If user #1's telephone can be controlled by the call client (e.g., via the computer modem or an add-on telephone interface as described in previous application U.S. Ser. No. 09/978,616) then dialing of the telephone call can be automated. Alternatively, the call client could display the telephone number for manual dialing by user #1.

What is claimed is:

1. A method of initiating a video telephony call between at least first and second users, wherein said users have first and second computers and first and second telephones, respectively, wherein said first and second computers are coupled to a computer network and have first and second IP addresses, respectively, wherein said first and second telephones have first and second telephone numbers, respectively, said method comprising the steps of:

said first and second computers sending log-in messages to a central server coupled to said computer network, wherein said central server stores said first and second IP addresses in association with said first and second telephone numbers, respectively;

said central server sending active user identifying information to said first and second computers for a plurality of users currently logged-in to said central server;

said first and second computers each displaying a plurality of available users in response to said active user identifying information, wherein said first computer displays a user selection item corresponding to said second user;

said first user activating said user selection item;

said first computer sending a video telephony call request identifying said second user to said central server in response to said activation of said selection item;

said central server forwarding said video telephony call request to said second computer;

said second computer displaying an acceptance selection item;

said second user selecting said acceptance selection item;

said second computer sending an acceptance message to said central server in response to said selection of said acceptance selection item;

said first and second computers launching respective video telephony call clients;

said call clients exchanging live video data in response to said first and second IP addresses stored in said central server for a video portion of said video telephony call; and said central server establishing a telephone call between said first and second telephones for a voice portion of said video telephony call using a public switched telephone network in response to said first and second telephone numbers stored in said central server.

2. The method of claim 1 wherein said central server includes an Internet chat server application and wherein said plurality of users currently logged-in to said central server is comprised of users interacting with said chat server application.

3. The method of claim 1 wherein said user selection item is comprised of a thumbnail representing said second user, said thumbnail being selectable by a pointing device of said first computer.

4. The method of claim 1 wherein said central server includes an instant messaging server application and wherein said plurality of users currently logged-in to said central server is comprised of a respective personalized contact list of each of said first and second users, respectively.

5. The method of claim 1 wherein said central server controls a private branch exchange (PBX) connected to said public-switched telephone network, said method further comprising the step of:

said server commanding said PBX to establish a telephone call using said first and second telephone numbers.

6. A method of establishing communication between at least first and second users, wherein said users have first and second computers and first and second telephones, respectively, wherein said first and second computers are coupled to a computer network and have first and second IP addresses, respectively, wherein said first and second telephones have first and second telephone numbers, respectively, said method comprising the steps of:

maintaining a central server on said computer network for providing integrated communication services comprising a video telephony service and a computer message service, said central server maintaining a first database of registered users of said video telephony service and a second database of registered users of said computer message service;

said first and second computers sending log-in messages to said central server to access said integrated communication services, wherein said central server stores said first and second IP addresses in association with said first and second telephone numbers, respectively;

said central server sending active user identifying information to said first and second computers for a plurality of users currently logged-in to said central server;

said first and second computers each displaying a plurality of available users in response to said active user identifying information, wherein said first computer displays a user selection item corresponding to said second user;

said first user activating said user selection item to initiate a request to said central server for contacting said second user;

said central server checking said first and second databases for said second user;

said central server reporting to said first user which of said integrated communication services for which said second user is registered; and said first user selecting an integrated communication service for communicating with said second user.

7. The method of claim 6 wherein, if said first and second users are registered for said video telephony service, and if said first user selects said video telephony service, then said method further comprising the steps of:

said first computer sending a video telephony call request;

said central server forwarding said video telephony call request to said second computer;

said second computer displaying an acceptance selection item;

said second user selecting said acceptance selection item;

said second computer sending an acceptance message to said central server in response to said selection of said acceptance selection item;

said first and second computers launching respective video telephony call clients;

said call clients exchanging live video data in response to said first and second IP addresses stored in said central server for a video portion of said video telephony call; and said central server establishing a telephone call between said first and second telephones for a voice portion of said video telephony call using a public switched telephone network in response to said first and second telephone numbers stored in said central server.

8. The method of claim 6 wherein said integrated communication services include an Internet chat server application and wherein said plurality of users currently logged-in to said central server is comprised of users interacting with said chat server application.

9. The method of claim 6 wherein said user selection item is comprised of a thumbnail representing said second user, said thumbnail being selectable by a pointing device of said first computer.

10. The method of claim 6 wherein said integrated communication services include an instant messaging server application and wherein said plurality of users currently logged-in to said central server is comprised of a respective personalized contact list of each of said first and second users, respectively.

11. The method of claim 6 wherein said central server controls a private branch exchange (PBX) connected to said public-switched telephone network, said method further comprising the step of:

said server commanding said PBX to establish a telephone call using said first and second telephone numbers.

\* \* \* \* \*